US00RE46232E

(19) United States
(12) Reissued Patent
Takayama

(10) Patent Number: US RE46,232 E
(45) **Date of Reissued Patent: *Dec. 6, 2016**

(54) IMAGE PROCESSING METHOD AND APPARATUS FOR PROCESSING AN IMAGE BY USING A FACE DETECTION RESULT

(71) Applicant: CANON KABUSHIKI KAISHA, Tokyo (JP)

(72) Inventor: Masahiro Takayama, Tokyo (JP)

(73) Assignee: Canon Kabushiki Kaisha, Tokyo (JP)

( * ) Notice: This patent is subject to a terminal disclaimer.

(21) Appl. No.: 14/255,748

(22) Filed: Apr. 17, 2014

Related U.S. Patent Documents

Reissue of:
(64) Patent No.: 8,160,310
Issued: Apr. 17, 2012
Appl. No.: 12/207,335
Filed: Sep. 9, 2008

(30) Foreign Application Priority Data

Sep. 11, 2007 (JP) ..... 2007-235948

(51) Int. Cl.

| | |
|---|---|
| ***G06K 9/00*** | (2006.01) |
| ***G06K 9/38*** | (2006.01) |
| ***H04N 1/60*** | (2006.01) |
| ***G06T 5/00*** | (2006.01) |
| ***H04N 5/232*** | (2006.01) |
| ***H04N 9/73*** | (2006.01) |

(52) U.S. Cl.
CPC ..... *H04N 1/6077* (2013.01); *G06T 5/007* (2013.01); *H04N 5/23219* (2013.01); *H04N 9/735* (2013.01); *G06T 2207/10024* (2013.01); *G06T 2207/20012* (2013.01); *G06T 2207/20021* (2013.01); *G06T 2207/30201* (2013.01)

(58) Field of Classification Search
CPC ... H04N 1/6077; H04N 5/23219; H04N 9/73
USPC ..... 382/118, 162, 167, 274; 348/223.1, 655
See application file for complete search history.

(56) References Cited

U.S. PATENT DOCUMENTS

| | | | | |
|---|---|---|---|---|
| 4,739,393 | A * | 4/1988 | Seki et al. | 348/225.1 |
| 6,975,759 | B2 | 12/2005 | Lin | |
| 7,139,425 | B2 * | 11/2006 | Takahashi | 382/167 |
| 7,599,093 | B2 * | 10/2009 | Kagaya | 358/2.1 |
| 7,636,108 | B2 * | 12/2009 | Suzuki et al. | 348/223.1 |

(Continued)

FOREIGN PATENT DOCUMENTS

| | | | |
|---|---|---|---|
| JP | 10-232934 | A | 9/1998 |
| JP | 2000-048184 | A | 2/2000 |

(Continued)

*Primary Examiner* — Adam L Basehoar
(74) *Attorney, Agent, or Firm* — Canon U.S.A. Inc., IP Division

(57) ABSTRACT

An image processing apparatus determines, when white balance correction is executed on an image signal of a face area detected by face detection unit, based on a first white balance correction value obtained by detecting white pixels, whether the corrected image signal of the face area is present in a second color signal area around a first color signal area indicating a flesh color. When the corrected image signal of the face area is determined to be present in the second color signal area, the image processing apparatus calculates a second white balance correction value for correcting the image signal based on a relationship between the corrected image signal of the face area and the first color signal area.

20 Claims, 8 Drawing Sheets

(56) References Cited

U.S. PATENT DOCUMENTS

| | | | | |
|---|---|---|---|---|
| 7,652,717 | B2 * | 1/2010 | Enge et al. | 348/371 |
| 7,864,222 | B2 * | 1/2011 | Yoshino et al. | 348/223.1 |
| 7,868,929 | B2 * | 1/2011 | Fujiwara | 348/223.1 |
| 8,045,014 | B2 * | 10/2011 | Fujiwara et al. | 348/223.1 |
| 2003/0001958 | A1 * | 1/2003 | Hoshuyama | 348/223.1 |
| 2003/0058350 | A1 * | 3/2003 | Ishimaru et al. | 348/223.1 |
| 2003/0156206 | A1 * | 8/2003 | Ikeda et al. | 348/223.1 |
| 2004/0156544 | A1 * | 8/2004 | Kajihara | 382/167 |
| 2004/0184671 | A1 * | 9/2004 | Fukuda et al. | 382/274 |
| 2004/0208363 | A1 * | 10/2004 | Berge et al. | 382/167 |
| 2006/0284991 | A1 * | 12/2006 | Ikeda | 348/223.1 |
| 2008/0002865 | A1 * | 1/2008 | Toyoda | 382/118 |
| 2008/0211925 | A1 * | 9/2008 | Misawa et al. | 348/223.1 |
| 2009/0002519 | A1 * | 1/2009 | Nakamura | 348/223.1 |
| 2009/0067683 | A1 * | 3/2009 | Takayama | 382/118 |
| 2009/0167892 | A1 * | 7/2009 | Takayama | 348/223.1 |
| 2009/0225226 | A1 * | 9/2009 | Kakuta | 348/655 |

FOREIGN PATENT DOCUMENTS

| | | | |
|---|---|---|---|
| JP | 2001-148863 | A | 5/2001 |
| JP | 2004-180114 | A | 6/2004 |
| JP | 2005-122612 | A | 5/2005 |

* cited by examiner

IMAGE PROCESSING METHOD AND APPARATUS FOR PROCESSING AN IMAGE BY USING A FACE DETECTION RESULT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue application of prior U.S. application Ser. No. 12/207,335 filed Sep. 9, 2008, now U.S. Pat. No. 8,160,310 issued Apr. 17, 2012, which claims priority from Japanese Patent Application No. 2007-235948 filed Sep. 11, 2007, which are hereby incorporated by reference herein in their entirety.*

BACKGROUND OF THE INVENTION

1. Field of the Invention

The present invention relates to an image processing apparatus and a method, and an imaging apparatus, and more particularly to an image processing apparatus and a method for processing an image by using a face detection result, and an imaging apparatus.

2. Description of the Related Art

An operation of a conventional white balance gain calculation circuit used for a digital camera will be described. First, as illustrated in FIG. 8, an imaging area is divided into a predetermined number of blocks (m blocks) of a plurality of pixels. For each of the blocks (1 to m), pixel values are added and averaged for each color to calculate color average values (R[i], G[i], B[i]). Then, for example, by using the following equation (1), color evaluation values (Cx[i], Cy[i]) are calculated:

$$Cx[i]=(R[i]-B[i])/Y[i]\times 1024 \quad Cy[i]=(R[i]+B[i])-2G[i]/Y[i]\times 1024 \tag{1}$$

Y[i]=R[i]+2G[i]+B[i], where [i] is an index number of each of the blocks.

A white object is captured under various light sources beforehand to calculate color evaluation values. Accordingly, if a white detection range 301 illustrated in FIG. 9 includes a color evaluation value calculated for each block, this block is determined to be white. Then, pixel values of blocks determined to be white are integrated. The white detection range 301 is obtained by plotting the calculated color evaluation values based on the white object captured beforehand under various light sources. In FIG. 9, a negative direction of x coordinate (Cx) indicates a color evaluation value when a white of a high color temperature object is captured, and a positive direction indicates a color evaluation value when a white of a low color-temperature object is captured. In the figure, y coordinate (Cy) indicates a green component ratio of the light source. A G component increases toward the negative direction, indicating that the light source is a fluorescent lamp.

Then, based on the integrated pixel values (sumR, sumG, sumB), white balance coefficients (WBCo_R, WBCo_G, WBCo_B) are calculated by using the following equation (2):

$$\begin{aligned} WBCo_R&=sumY\times 1024/sumR \\ WBCo_G&=sumY\times 1024/sumG \\ WBCo_B&=sumY\times 1024/sumB \end{aligned} \tag{2}$$

where sumY=(sumR+2×sumG+sumB)/4.

However, the conventional white balance coefficient calculation method has the following problems. Under a light source such as sunlight, white color evaluation values are distributed around an area A in FIG. 9, and flesh (skin) colors are distributed around an area B. Flesh color evaluation values under the sunlight are distributed in an area almost similar to that of white color evaluation values under a low color light source. Thus, if there is a little white part in an imaging area, and a picture of a person is taken in close-up as illustrated in FIG. 10, color evaluation values in the imaging area are distributed in the area B in FIG. 9. Consequently, a flesh color is erroneously determined to be white under a low color temperature, and the human flesh is corrected to be white. Also, when chromatic colors distributed around a color area that indicates a human flesh are scattered all over the imaging area, the chromatic colors are erroneously determined to be white, and the flesh is corrected to be white.

The above-described problems have conventionally been dealt with by determining a light source to be external light when an object illuminance is high, and the white detection range is narrowed to prevent the flesh color from being erroneously determined to be white.

Generally, fluorescent lamps include a variety of light sources, such as a source where whites are distributed around an area C, and a light source where whites are distributed below the area C. The white detection range has to be expanded to deal with such light sources. However, under high color temperature fluorescent lamps of low illuminance or middle color temperature fluorescent lamps, flesh colors may be distributed around a portion (area C) below a blackbody locus. Thus, expansion of the white detection range causes erroneous determination of the flesh color, resulting in a whitened flesh color.

U.S. Pat. No. 6,975,759 discusses a method of detecting a face, extracting a flesh color of the face when the face is detected, comparing the extracted flesh color with a reference flesh color, and correcting white balance based on the comparison result.

However, this conventional white balance correction value calculation method makes no consideration about a case where a face detection circuit erroneously detects a face. Consequently, even when the face detection circuit erroneously detects a false face area, the false face area may be corrected to be an appropriate flesh color. Thus, a desired white balance correction value cannot be acquired.

Depending on performance of an imaging apparatus regarding a processing speed, face detection may be unavailable during shooting. In such an imaging apparatus. even if a face is detected at a shooting preparation stage, the position of an object may be shifted during shooting. Such a case has not been taken into consideration. In other words, even if a face is correctly detected during a shooting preparation period, white balance correction accuracy may be lowered in the end. FIG. 11 illustrates an example where face detection is executed before a first switch SW1 is turned on, and the position of an object is shifted immediately before turning-on of a second switch SW2 (switch for actual shooting). Use of the face detection result obtained immediately before turning-on of the first switch SW1 makes it difficult to acquire a correct face color evaluation value when the second switch SW2 is turned on (at the time of actual shooting), thus resulting in lowering white balance correction accuracy.

SUMMARY OF THE INVENTION

The present invention is directed to an image processing apparatus and a method capable of performing more stable white balance correction based on a face detection result, and an imaging apparatus.

According to an aspect of the present invention, an image processing apparatus for processing an image signal of an image obtained by capturing includes a first calculation unit configured to calculate a first white balance correction value by detecting white pixels from the image, a face detection unit configured to detect a face area from the image, a determination unit configured to determine, when white balance correction based on the first white balance correction value is executed on an image signal of the face area detected by the face detection unit, whether the corrected image signal of the face area is present in a second color signal area around a first color signal area indicating a flesh color, and a second calculation unit configured to calculate, when the determination unit determines that the corrected image signal of the face area is present in the second color signal area, a second white balance correction value for correcting the image signal based on a relationship between the corrected image signal of the face area and the first color signal area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
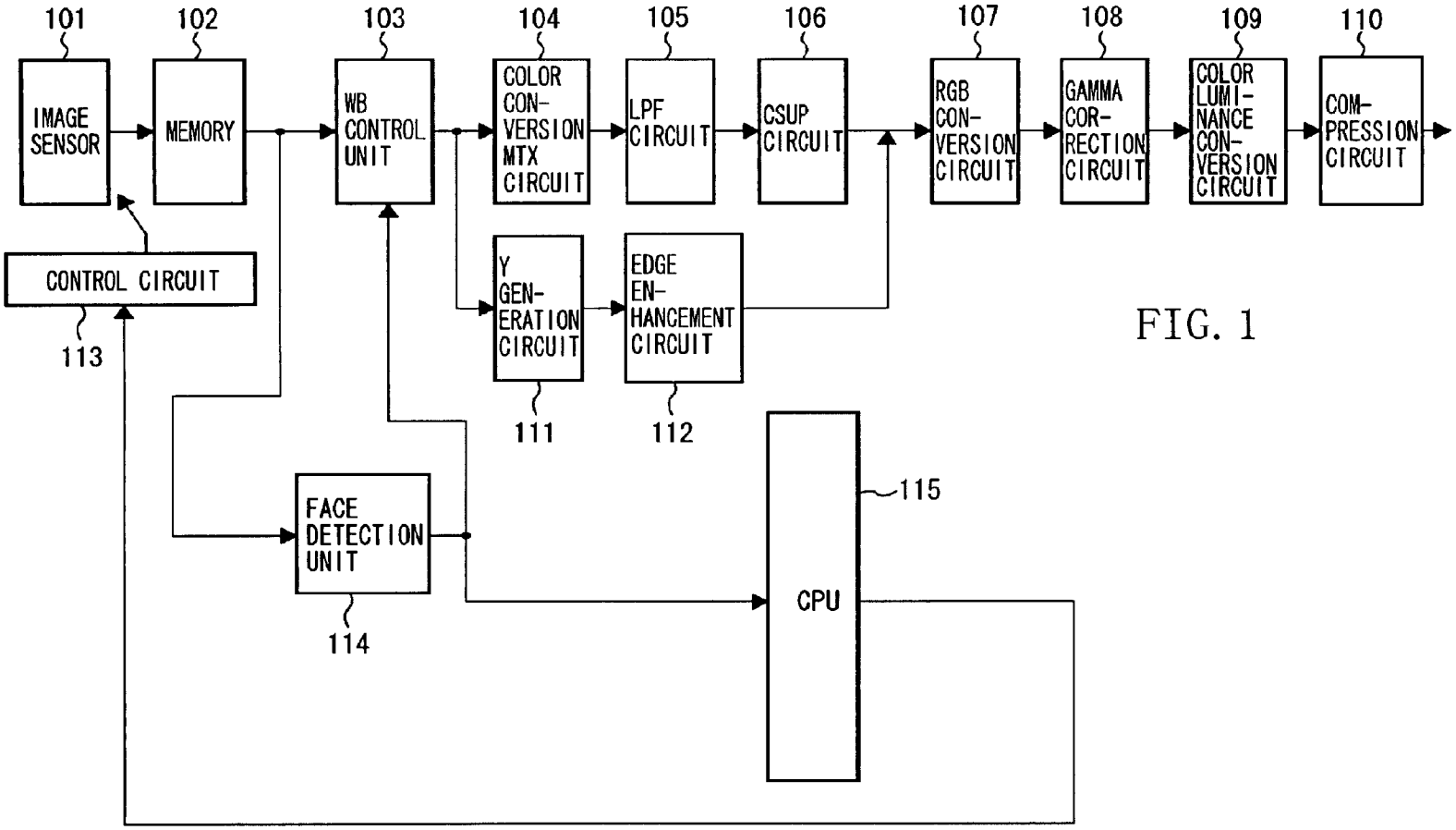
FIG. 1 is a block diagram illustrating a functional configuration of an imaging apparatus having a face detection function according to an exemplary embodiment of the present invention.

FIG. 1 is a block diagram illustrating, as an example of an image processing apparatus, a functional configuration of an imaging apparatus having a face detection function according to an exemplary embodiment of the present invention.

Referring to FIG. 1, an image sensor 101 includes a charge-coupled device (CCD) or a complementary metal-oxide semiconductor (CMOS), whose surface is covered with, for example, RGB color filters of Bayer array to enable color image capturing. A memory 102 temporarily stores an image signal obtained from the image sensor 101.

A face detection unit 114 detects a face area based on the image signal stored in the memory 102. Various methods have been proposed as techniques of detecting face areas. Any method can be used as long as information on the position and size of a face can be obtained. Thus, these methods are in no way limitative of the present invention. For example, a method using learning represented by a neutral network, and a method of extracting parts such as eyes or a nose having features in physical shape by template matching, are known. Another available technique is a method that detects an image feature amount, such as a flesh (skin) color or an eye shape, and that analyzes it by using a statistical method (see Japanese Patent Application Laid-Open Nos. 10-232934 and 2000-48184). Other currently available products include a method of detecting a face by using wavelet transform and an image feature amount, and a method that combines template matching.

Figure 2:
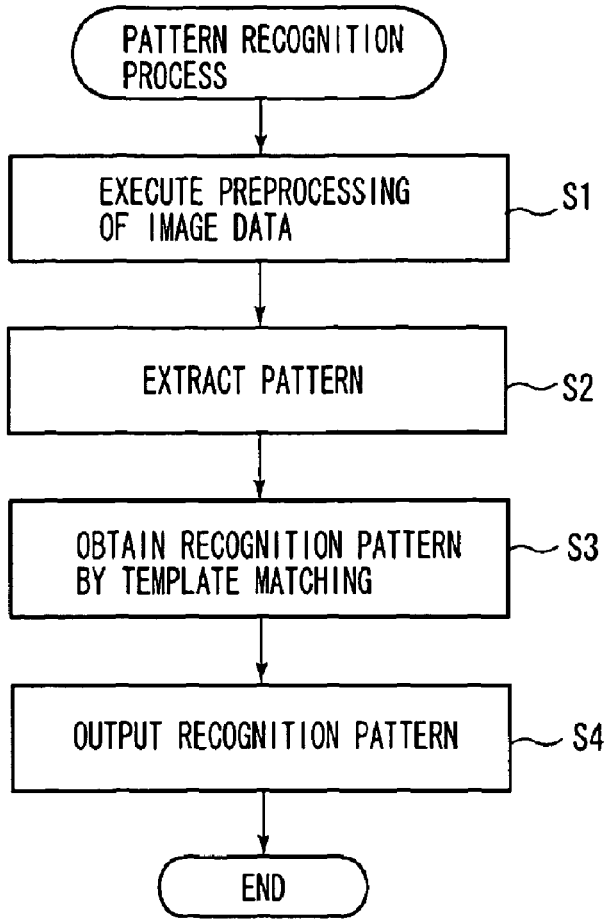
FIG. 2 is a flowchart illustrating a pattern recognition process based on template matching.

As a face detection method, a template matching method, which is one of pattern recognition methods, will be described. The pattern recognition is a process of correlating an observed pattern with one of predefined concepts (classes). FIG. 2 is a flowchart of a pattern recognition process executed by the face detection unit 114.

Figure 3:
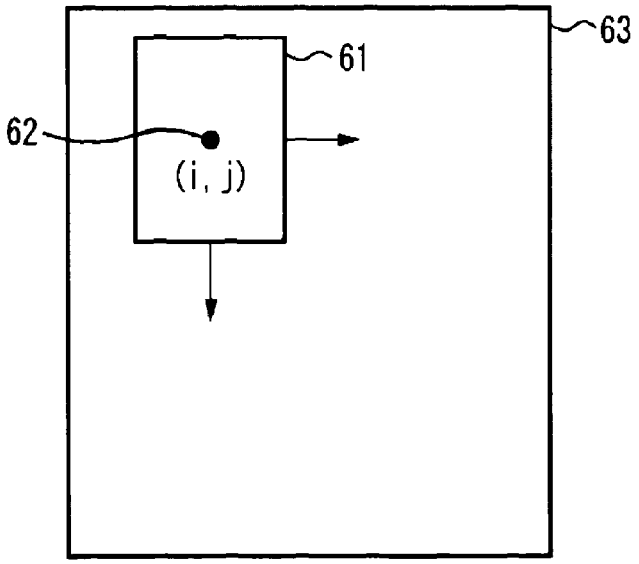
FIG. 3 illustrates a template matching concept.

First, in step S1, the face detection unit 114 reads out image data from the memory 102 and pre-processes the image data. Instep S2, the face detection unit 114 extracts a pattern of a feature part from the pre-processed image data. The face detection unit 114 correlates the extracted pattern with a template (standard pattern) (template matching). For example, as illustrated in FIG. 3, when a pattern 63 of a feature part is extracted, a center point 62 of a template 61 is positioned on a certain coordinate point (i, j) of the extracted pattern 63. Then, the face detection unit 114 calculates similarities between overlapped parts of the template 61 and the pattern 63 while shifting the position of the center point 62 within the pattern 63, and determines a position where a similarity becomes maximal. By matching the pattern 63 with the template 61 including a shape such as eyes or ears, the face detection unit 114 can obtain information on the position of eyes or a face area (face coordinates).

Thus, the face detection unit 114 obtains the recognition pattern in step S3, and outputs the obtained recognition pattern in step S4 to finish the pattern recognition process.

Referring back to FIG. 1, if a face is detected, a central processing unit (CPU) 115 calculates, based on a signal sent from the face detection unit 114, a shutter speed Tv and an aperture value Av to obtain the optimal brightness for the face, and calculates a driving amount of a focus lens to focus on the face. On the other hand, if no face is detected, the CPU 115 calculates a shutter speed Tv and an aperture value Av to obtain the optimal brightness for the entire image, and calculates a driving amount of the focus lens to focus on an object present in a predetermined focus area. The exposure values (Tv and Av) and the driving amount of the focus lens calculated by the CPU 115 are sent to a control circuit 113. Based on these values, a lens, a diaphragm, and a shutter (not shown), and the image sensor 101 are controlled.

A white balance (WB) control unit 103 calculates a WB correction value based on the image signal stored in the memory 102 and face information obtained from the face detection unit 114. By using the calculated WB correction value, the WB control unit 103 performs white balance correction (WB correction) on the image signal stored in the memory 102. A method of calculating the WB correction value used by the WB control unit 103 will be described below in detail.

A color conversion matrix (MTX) circuit 104 amplifies the image signal WB-corrected by the WB control unit 103 by color gains to convert it into color-difference signals R-Y and B-Y so that the image signal can be reproduced by an optimal color. A low-pass filter (LPF) circuit 105 limits a frequency band of the color-difference signals R-Y and B-Y. A chroma-suppress (CSUP) circuit 106 suppresses a false color signal of a saturated part in the image signal frequency-band-limited by the LPF circuit 105.

The image signal WB-corrected by the WB control unit 103 is also output to a luminance signal (Y) generation circuit 111 to generate a luminance signal Y. An edge enhancement circuit 112 carries out edge enhancement for the generated luminance signal Y.

An RGB conversion circuit 107 converts the color-difference signals R-Y and B-Y output from the CSUP circuit 106, and the luminance signal (Y) output from the edge enhancement circuit 112 into RGB signals, and then a gamma correction circuit 108 corrects gradation of the signals. Subsequently, a color luminance conversion circuit 109 converts the signals into YUV signals, and then the YUV signals are compressed, for example, by using JPEG compression at a compression circuit 110 to be recorded as image signals on an external recording medium or an internal recording medium.

Figure 4:
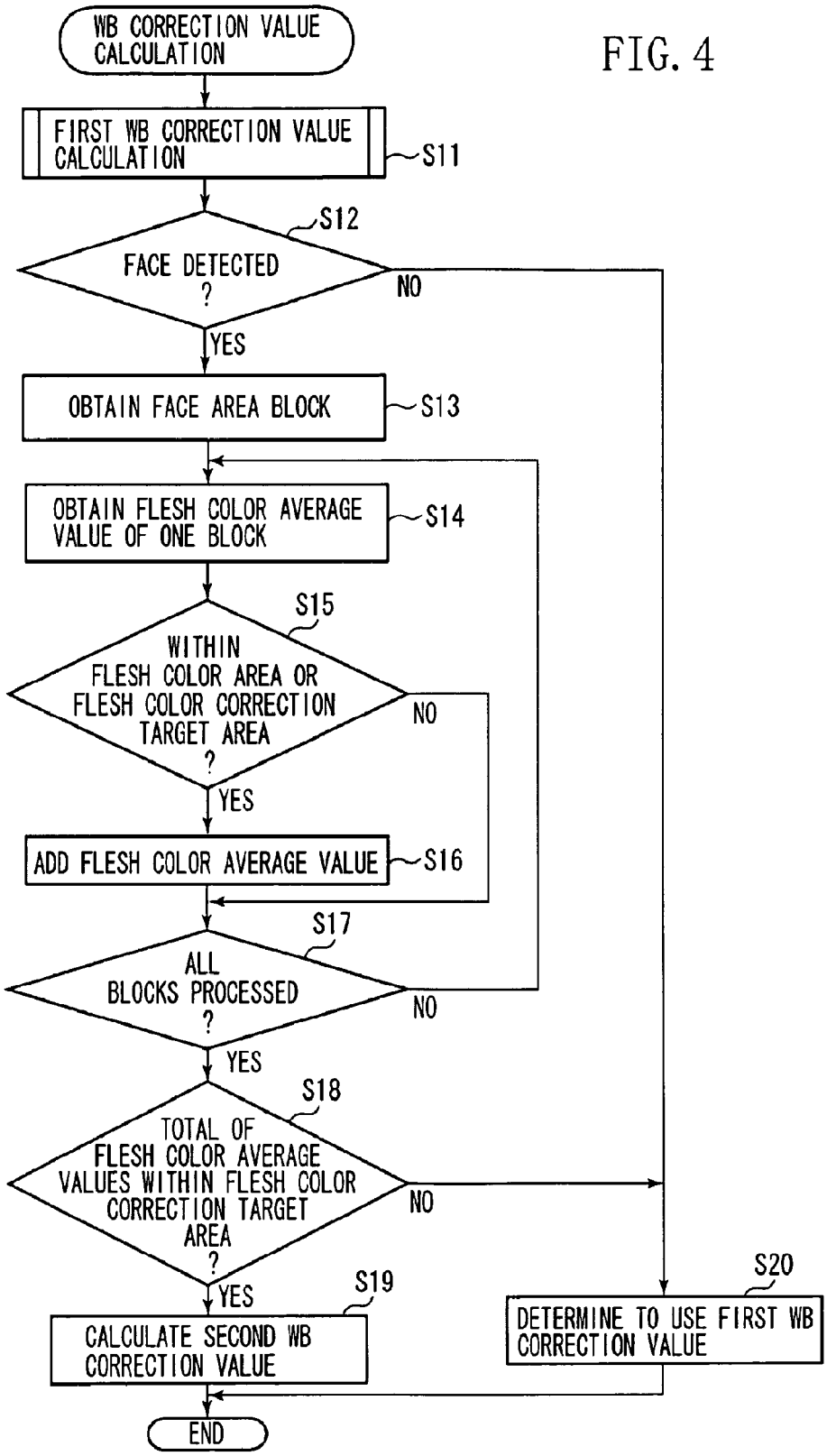
FIG. 4 is a flowchart illustrating a method of calculating a white balance (WB) correction value according to an exemplary embodiment of the present invention.

Referring to FIG. 4, a method of calculating a WB correction value according to the exemplary embodiment will be described. The method of calculating a WB correction value according to the exemplary embodiment enables acquisition of a WB correction value to make a face area optimal based on a face detection result. It is presumed that the face detection unit 114 has carried out the face detection process by the aforementioned method referring to, for example, FIGS. 2 and 3, based on the obtained image signal immediately before the process of FIG. 4, and has already obtained a face detection result. The calculation of the WB correction value can be executed by the CPU 115 or the WB control unit 103, or a device exclusively used for WB correction value calculation can be added.

Figure 5:
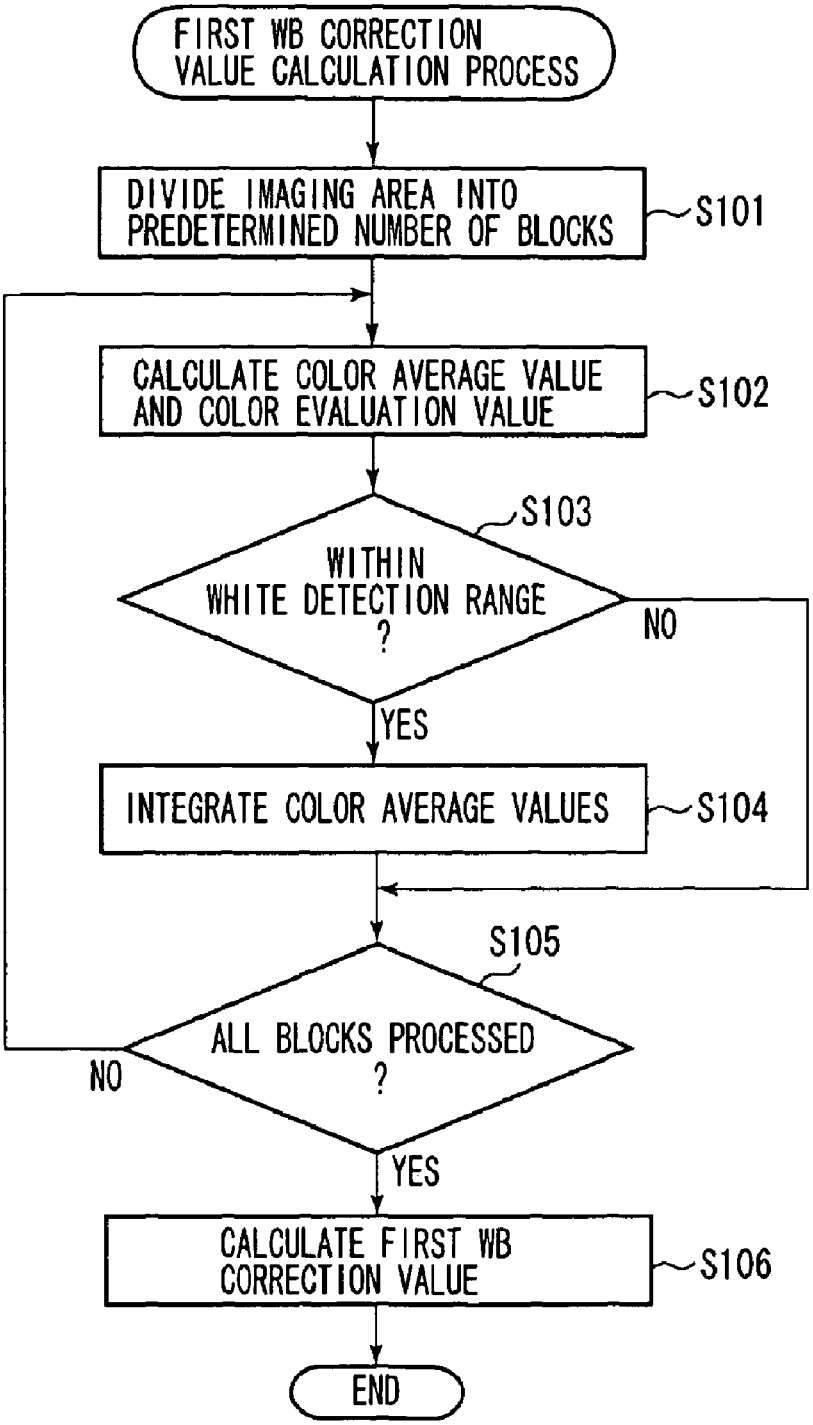
FIG. 5 is a flowchart illustrating a process of calculating a first WB correction value according to an exemplary embodiment of the present invention.

First, in step S11, for example, the WB control unit 103 detects white pixels from the image signal stored in the memory 102 to calculate a first white balance correction value (first WB correction value). A method for calculating the first WB correction value will be described next in detail referring to FIG. 5.

Figure 8:
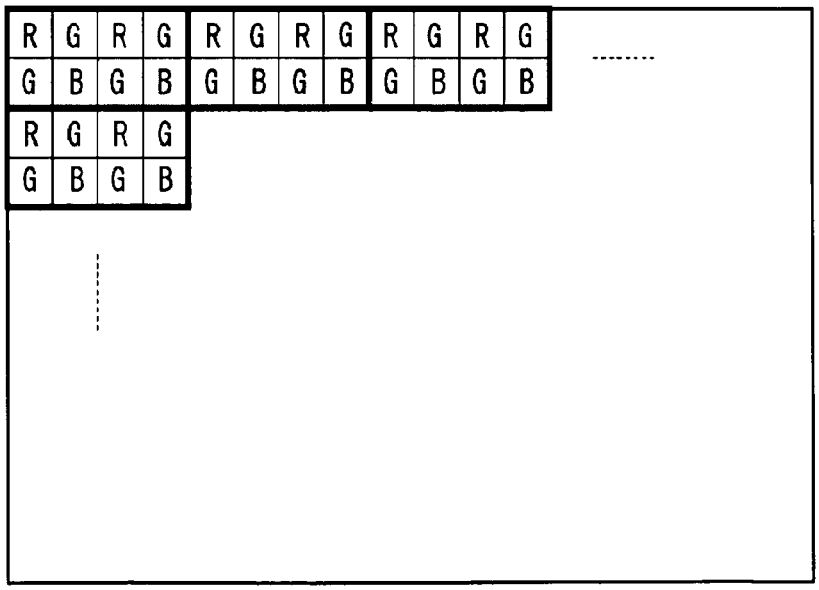
FIG. 8 illustrates an example where an imaging area is divided into a predetermined number of blocks.

First, in step S101, the WB control unit 103 reads out an image signal stored in the memory 102, and divides the image area into m blocks illustrated in FIG. 8. In step S102, the WB control unit 103 adds and averages pixel values for each of the blocks (1 to m) and for each of the colors to calculate color average values (R[i], G[i], B[i]), and then calculates color evaluation values (Cx[i], Cy[i]) by using the following equation (1):

$$Cx[i]=(R[i]B[i])/Y[i]\times 1024 \quad Cy[i]=(R[i]+B[i])-2G[i]/Y[i]\times 1024 \tag{1}$$

Y[i]=R[i]+2G[i]+B[i], where [i] is an index number of each block.

Figure 9:
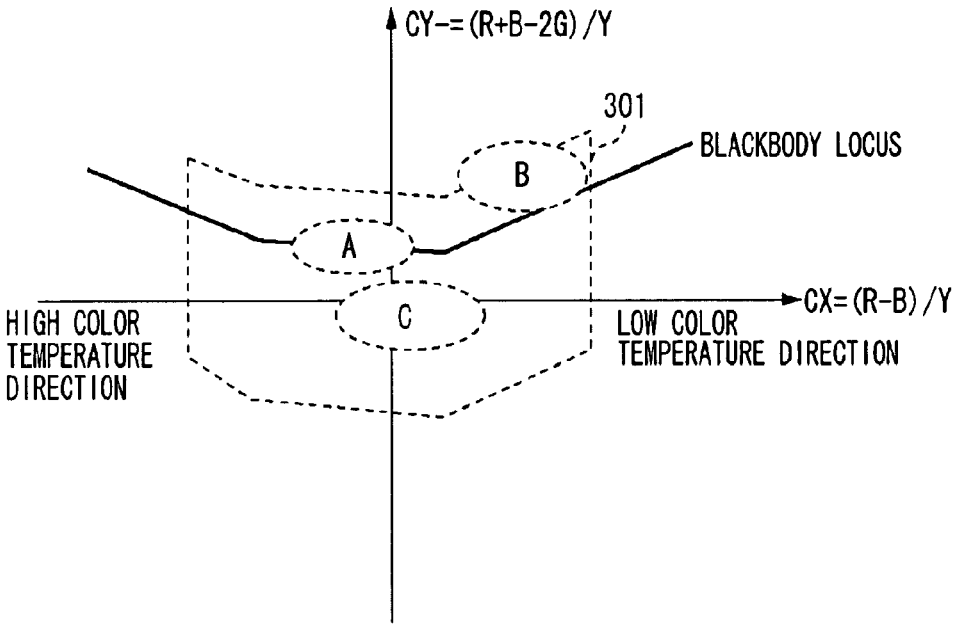
FIG. 9 illustrates a white detection range.
Figure 10:
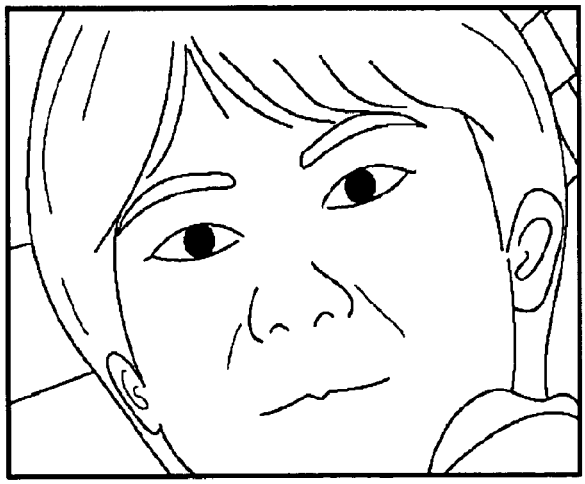
FIG. 10 illustrates an example where a face is shot by a camera in close-up as an object.
Figure 11:
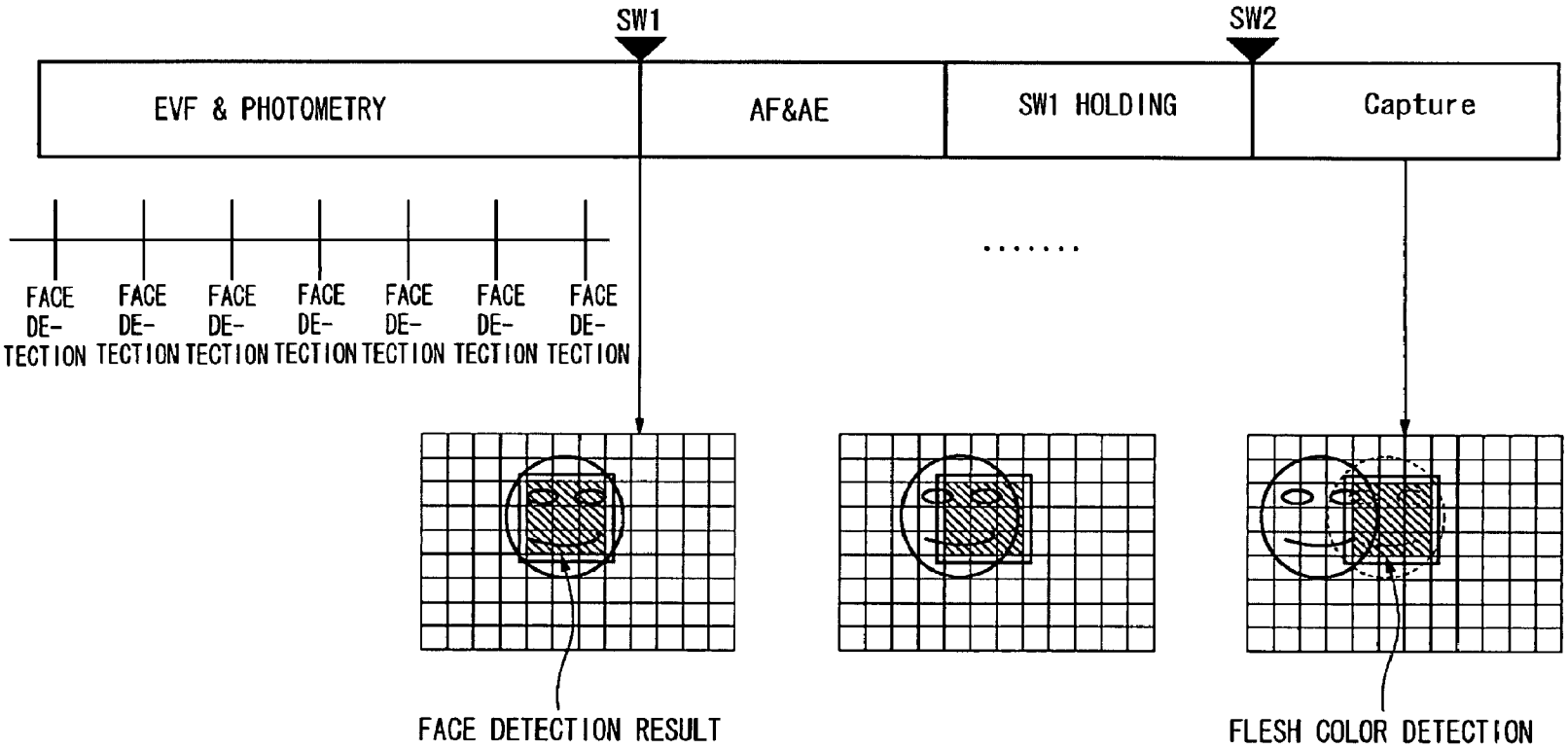
FIG. 11 PRIOR ART
FIG. 11 illustrates an example of a problem likely to occur in a conventional white balance correction method.

In step S103, the WB control unit 103 determines whether color evaluation values (Cx[i], Cy[i]) of the i-th block calculated in step S102 are included within a predetermined white detection range 301 illustrated in FIG. 9. The white detection range 301 is obtained by plotting color evaluation values that are calculated in advance based on the data of whites captured under different light sources. In FIG. 9, a negative direction of x coordinate (Cx) indicates a color evaluation value when a white of a high color temperature object is shot, and a positive direction indicates a white of a low color temperature object. In the figure, y coordinate (Cy) indicates a green component ratio of the light source. A G component increases toward a negative direction, indicating that the light source is a fluorescent lamp.

If the calculated color evaluation values (Cx[i], Cy[i]) are included within the white detection range 301 (YES in step S103), the WB control unit 103 determines that the block is white. Then, in step S104, the WB control unit 103 integrates color average values (R[i], G[i], B[i]) of the block. If the calculated color evaluation values (Cx[i], Cy[i]) are not included (NO in step S103), the WB control unit 103 proceeds to step S105 without any addition. Steps S103 and S104 can be represented by the following equation (3):

$$\begin{aligned} SumR &= \sum_{i=0}^{m} Sw[i]\times R[i] \\ SumG &= \sum_{i=0}^{m} Sw[i]\times G[i] \\ SumB &= \sum_{i=0}^{m} Sw[i]\times B[i] \end{aligned} \tag{3}$$

In equation (3), Sw[i] is set to 1 if color evaluation values (Cx[i], Cy[i]) are included within the white detection range 301, and set to 0 if not included. In this way, whether to add color average values (R[i], G[i], B[i]) is practically determined based on the determination in step S103. In step S105, the WB control unit 103 determines whether the aforementioned process has been executed for all the blocks. If there is a block yet to be processed (NO in step S105), the WB control unit 103 returns to step S102 to repeat the process. If all of the blocks have been processed (YES in step S105), the process proceeds to step S106.

In step S106, the WB control unit 103 calculates first WB correction values (WBCo1_R, WBCo1_G, WBCo1_B) based on the obtained integrated values (sumR, sumG, sumB) of the color evaluation values by using the following equation (4):

$$WBCo1_R=sumY\times1024/sumR$$

$$WBCo1_G=sumY\times1024/sumG \quad (4)$$

$$WBCo1_B=sumY\times1024/sumB$$

where sumY=(sumR+2×sumG+sumB)4.

After the calculation of the first WB correction values, in step S12, the WB control unit 103 determines whether a face is detected. If no face is detected (NO in step S12), then in step S20, the WB control unit 103 determines to use the first WB correction values, calculated in step S11, for the WB process thereof. Then, the process ends.

If a face is detected (YES in step S12), then in step S13, the WB control unit 103 obtains blocks of a face area. In step S14, the WB control unit 103 obtains the color average values (R[i], G[i], B[i]) calculated in step S102 to calculate the first WB correction values of one of the blocks.

Then, the WB control unit 103 multiplies each of the color average values obtained in step S14 with each of the corresponding first WB correction values obtained in step S11 to calculate a flesh color average value (value obtained by WB-correcting the color average value of the face area based on the first WB correction value, i.e., a corrected image signal). In step S15, the WB control unit 103 determines which of a flesh color area (area (A) in FIG. 6), a flesh color correction target area (area (B) in FIG. 6), and a flesh color correction non-target area (area (C) in FIG. 6) the flesh color average value belongs to. The flesh color area (A) corresponds to a first color signal area, and the flesh color correction target area (B) corresponds to a second color signal area that is a surrounding area of the first color signal area. If the flesh color average value is in the flesh color area (A) in FIG. 6 (first color signal area) or the flesh color correction target area (B) (second color signal area) (YES in step S15), then in step S16, the WB control unit 103 adds the flesh color average value to a total of flesh color average values calculated up to then. If the flesh color average value is in the flesh color correction non-target area (C) (NO in step S15), the WB control unit 103 proceeds to step S17 without adding the flesh color average of the block. The flesh color area (A) and the flesh color correction target area (B) illustrated in FIG. 6 can be determined by, for example, capturing a plurality of flesh colors under a white light, such as sunlight, in advance, and using a statistical method.

Figure 6:
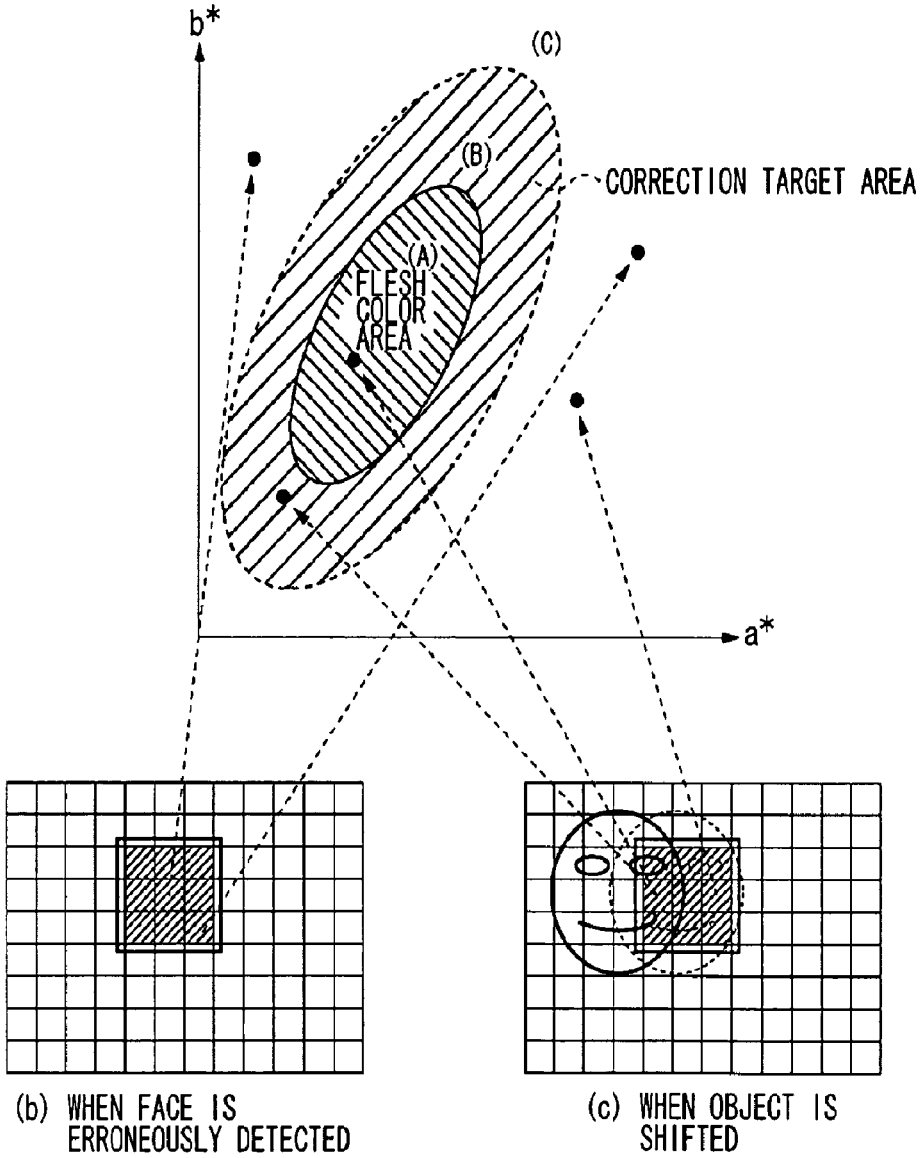
FIG. 6 illustrates a method of determining flesh (skin) color correction according to an exemplary embodiment of the present invention.

For example, when a face is erroneously detected (imaging area (b) in FIG. 6), or when an object is completely shifted, flesh evaluation values of the block are likely to be distributed in the flesh color correction non-target area (C) in FIG. 6. When a face area is shifted (imaging area (c) in FIG. 6), flesh evaluation values of the face area are distributed in the flesh color area (A) or the flesh color correction target area (B) in FIG. 6. Thus, only the blocks present in the flesh color area (A) or the flesh color correction target area (B) is extracted to be reflected in the WB calculation process. Instead of removing the flesh color evaluation values present in the flesh color correction non-target area (C) based on the determination in step S15, weighted addition can be carried out. In this case, a weight applied to the flesh color evaluation value in the flesh color correction non-target area (C) is set to be lower than the weight that is applied to the flesh color evaluation value in the flesh color area (A) or the flesh color correction target area (B).

After the aforementioned process is executed a number of times equal to the number of processed blocks (i.e., until the process becomes YES in step S17), the WE control unit 103 proceeds to step S18. In step S18, the WB control unit 103 determines whether a total (total of image signals) of flesh color average values obtained by the addition in step S16 is within the flesh color correction target area (B).

If the total of the flesh color average values is within the flesh color area (A) in FIG. 6 (NO in step S18), it can be determined that the flesh color has appropriately been corrected based on the first WB correction values. Thus, in step S20, the WB control unit 103 determines to use the first WB correction values. If the total of the flesh color average values is in the flesh color correction target area (B) (YES in step S18), the WB control unit 103 determines that the flesh color corrected based on the first WB correction values has not been appropriately WB-corrected. Accordingly, in step S19, the WB control unit 103 calculates second white balance correction values (second WB correction values) to move the total of the flesh color average values toward the flesh color area. If the total of the flesh color average values is in the flesh color correction non-target area (C) (NO in step S18), then in step S20, the WB control unit 103 determines that the detected flesh color evaluation values do not represent a human flesh, and that the first WB correction values are used.

Figure 7:
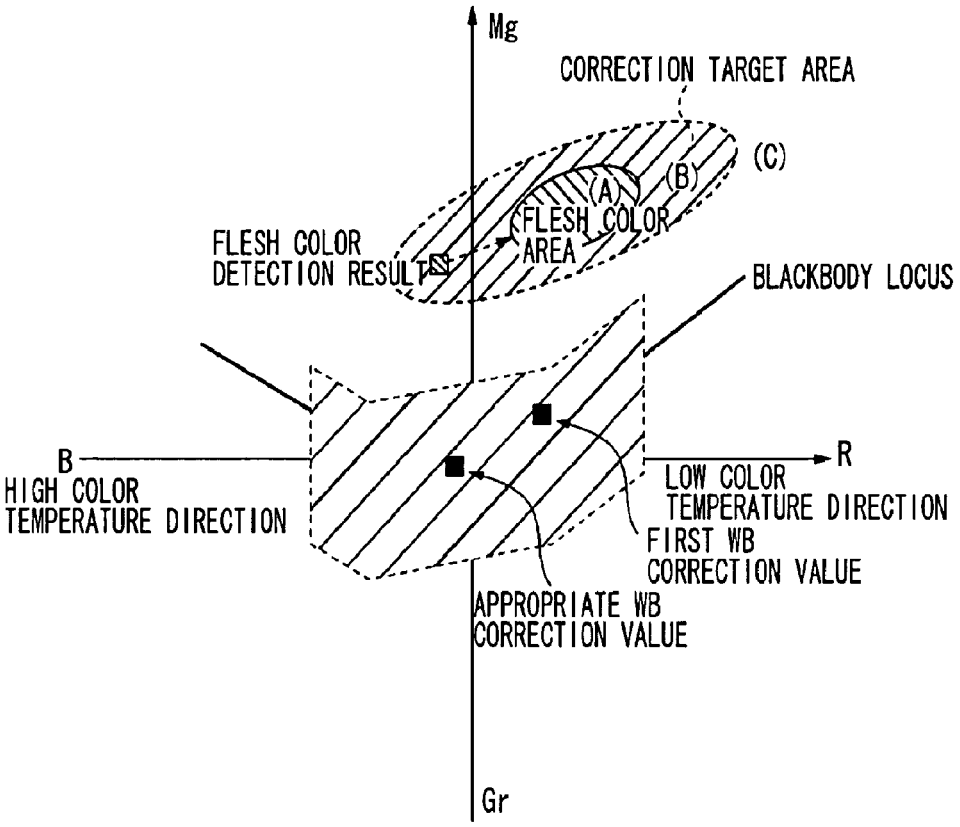
FIG. 7 illustrates a concept of second WB correction value calculation according to an exemplary embodiment of the present invention.

FIG. 7 illustrates a concept of the second WB correction value calculation performed in step S19. FIG. 7 illustrates a case where a flesh color is erroneously recognized to be white under a certain light source, and the first WB correction values were calculated. Since the first WB correction values shift to a low color temperature direction from appropriate WB control values, a flesh color after first WB correction shifts to a cold color direction. In this case, flesh color evaluation values are positioned in the cold color direction, which is out of the area indicating an appropriate flesh color. Accordingly, by applying R gain as a white balance correction value larger than that of the first WB correction values, the flesh color can be appropriately corrected. The broken-line arrow in FIG. 7 indicates the direction and the size of the correction. A target position of the broken-line direction can be any position in the flesh color area (A). In FIG. 7, a boundary position of the flesh color area where a distance between a flesh color detection result and the flesh color area is shortest is set as a target position. As another example, one point in the flesh color area (A) can be defined beforehand as a flesh color point, which can also be determined as a target position.

According to the above-described exemplary embodiment, erroneous corrections or excessive corrections, which may be caused by an erroneous face recognition or a shift of an object during shooting, can be reduced. Thus, more stable white balance correction can be carried out according to a face detection result.

The present invention can be applied to a system that includes a plurality of devices (e.g., a host computer, an interface device, and a camera head), or to an apparatus (e.g., a digital still camera or a digital video camera).

The present invention can also be achieved as follows. First, a storage medium or a recording medium, which stores software program code to realize the functions of the exemplary embodiment, is supplied to a system or an apparatus. Then, a computer (CPU or MPU) of the system or the computer in an apparatus reads out the program code stored in the storage medium and executes the same. In this case, the program code read out from the storage medium realizes the functions of the exemplary embodiment.

The present invention is not limited to the case where the computer executes the read program code to realize the functions of the exemplary embodiment. The invention can also be achieved as follows. Based on instructions of the readout program code, an operating system (OS) operating in the computer executes a part or the whole of the actual process to realize the functions of the exemplary embodiment. The storage medium which stores the program code, for example, can be a floppy disk, a hard disk, a read-only memory (ROM), a random access memory (RAM), a magnetic tape, a non-volatile memory card, a compact disc-ROM (CD-ROM), a CD-recordable (CD-R), a digital versatile disc (DVD), an optical disk, or a magneto-optical disk (MO). A computer network, such as a local area network (LAN) or a wide area network (WAN), can be used for supplying the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

[This application claims priority from Japanese Patent Application No. 2007-235948 filed Sep. 11, 2007, which is hereby incorporated by reference herein in its entirety.]

What is claimed is:

1. An image processing apparatus for processing an image signal of an image obtained by capturing, the image processing apparatus comprising:

a first calculation unit configured to calculate a first white balance correction value by detecting white pixels from the image;

a face detection unit configured to detect a face area from the image;

a determination unit configured to determine, after white balance correction based on the first white balance correction value is executed on an image signal of the face area detected by the face detection unit, whether the corrected image signal of the face area is present in a second color signal area around a first color signal area indicating a flesh color; [and]

a second calculation unit configured to calculate, when the determination unit determines that the corrected image signal of the face area is present in the second color signal area, a second white balance correction value for correcting the image signal based on a relationship between the corrected image signal of the face area and the first color signal area*; and*

*a white balance correction unit configured to correct white balance of the image,*

*wherein the white balance correction unit executes white balance correction selectively by using the second white balance correction value when the determination unit determines that the corrected image signal of the face area is present in the second color signal area, and by using the first white balance correction value when the determination unit determines that the corrected image signal of the face area is not present in the second color signal area.*

[2. The image processing apparatus according to claim 1, further comprising a white balance correction unit configured to correct white balance of the image, wherein the white balance correction unit executes white balance correction selectively by using the second white balance correction value when the determination unit determines that the corrected image signal of the face area is present in the second color signal area, and by using the first white balance correction value when the determination unit determines that the corrected image signal of the face area is not present in the second color signal area.]

3. The image processing apparatus according to claim 1, wherein the second calculation unit corrects the image signal so that the image signal of the face area is located in the first color signal correction area.

4. The image processing apparatus according to claim 1, [wherein the first calculation unit detects the white pixels of the image for each predetermined block] *wherein the image is divided into blocks*, and the determination unit executes the determination on the image signal of the face area for each [predetermined] block.

5. An image processing apparatus for processing an image signal of an image obtained by capturing, the image processing apparatus comprising:

a white balance correction unit configured to correct white balance of the image signal;

a face detection unit configured to detect a face area from the image;

a first calculation unit configured to calculate a first white balance correction value used for the white balance correction based on an image signal of a block which is present in a color signal area indicating white [from] among blocks into which the image is divided and each of which includes a plurality of pixels; and a second calculation unit configured to add corrected image signals present in a first color signal area indicating a flesh color and a second color signal area that is a surrounding area of the first color signal area [from] among corrected image signals obtained after correcting white balance of image signals of blocks included in the face area based on the first white balance correction value when the face detection unit detects the face area, and to calculate a second white balance correction value for correcting a total of image signals to enter the first color signal area when the total of image signals obtained by the addition is present in the second color signal area, wherein the white balance correction unit executes white balance correction by using the second white balance correction value when the second white balance correction value is calculated.

6. The image processing apparatus according to claim 5, wherein the second calculation unit adds the corrected image signals included in neither of the first and second color signal areas, and adds the corrected image signals included in the first color signal area, the corrected image signals included in the second color signal area, and the corrected image signals included in neither of the first and second color signal areas after applying different weights to the respective corrected image signals, and wherein the weights applied to the corrected image signals included in neither of the first and second color signal areas are lower than the weights applied to the corrected image signals included in the first and second color signal areas.

7. The image processing apparatus according to claim 5, wherein, when no second white balance correction value is calculated, the white balance correction unit executes white balance correction by using the first white balance correction value.

8. The image processing apparatus according to claim 5, wherein the first and second calculation units calculate the first and second white balance correction values by using image signals of images obtained by capturing after the image processed by the face detection unit.

9. An imaging apparatus comprising:

an imaging unit configured to output an image signal of an image obtained by capturing; and the image processing apparatus according to claim 5.

10. A method for processing an image signal of an image obtained by capturing, the method comprising:

calculating, using a processor, a first white balance correction value by detecting a white pixel from the image;

detecting a face area from the image;

determining whether the corrected image signal of the face area is present in a second color signal area around a first color signal area indicating a flesh color after white balance correction is executed on an image signal of the detected face area based on the first white balance correction value; [and]

calculating, using a processor, a second white balance correction value for correcting the image signal when the corrected image signal of the face area is determined to be present in the second color signal area based on a relationship between the corrected image signal of the face area and the first color signal area*; and*

*executing white balance correction selectively by using the second white balance correction value when it is determined that the corrected image signal of the face area is present in the second color signal area, and by using the first white balance correction value when it is determined that the corrected image signal of the face area is not present in the second color signal area.*

11. A method for processing an image signal of an image obtained by capturing, the method comprising:

detecting a face area from the image;

calculating, using a processor, a first white balance value used for white balance correction based on an image signal of a block present in a color signal area indicating white [from] among blocks into which the image is divided for a plurality of pixels;

adding, when the face area is detected, corrected image signals present in a first color signal area indicating a flesh color and a second color signal area that is a surrounding area of the first color signal area [from] among corrected image signals obtained after correcting white balance of image signals of blocks included in the face area based on the first white balance correction value, and calculating, using a processor, a second white balance correction value when a total of image signals obtained by the addition is present in the second color signal area for correcting the total of image signals to enter the first color signal area;

executing white balance correction for the image signal by using the first and second white balance correction values; and executing, when the second white balance correction value is calculated, white balance correction by using the second white balance correction value.

*12. An image processing apparatus for processing an image signal of an image obtained by capturing, the image processing apparatus comprising:*

*a first calculation unit configured to calculate a first white balance correction value based on the image;*

*a face detection unit configured to detect a face area from the image;*

*a determination unit configured to determine, in a case where white balance correction based on the first white balance correction value is executed on an image signal of a face area, whether the corrected image signal of the face area is present in a second color signal area different from a first color signal area indicating a flesh color;*

*a second calculation unit configured to calculate, in a case where the determination unit determines that the corrected image signal of the face area is present in the second color signal area, a second white balance correction value for correcting the image signal based on a relationship between the corrected image signal of the face area and the first color signal area; and*

*a white balance correction unit configured to correct white balance of the image using the first white balance correction value and the second white balance correction value.*

*13. The image processing apparatus according to claim 12, wherein the first calculation unit calculates the first white balance correction value by detecting white pixels from the image.*

*14. The image processing apparatus according to claim 12, wherein the second color signal area is around a first color signal area.*

*15. The image processing apparatus according to claim 12, wherein the white balance correction unit executes white balance correction selectively by using the second white balance correction value in a case where the determination unit determines that the corrected image signal of the face area is present in the second color signal area, and by using the first white balance correction value in a case where the determination unit determines that the corrected image signal of the face area is not present in the second color signal area.*

*16. The image processing apparatus according to claim 12, wherein the second calculation unit corrects the image signal so that the image signal of the face area is located in the first color signal area.*

*17. The image processing apparatus according to claim 12, wherein the image is divided into blocks, and the determination unit executes the determination on the image signal of the face area for each block.*

*18. A method for processing an image signal of an image obtained by capturing, the method comprising:*

*calculating, using a processor, a first white balance correction value;*

*detecting a face area from the image;*

*determining, in a case where white balance correction is executed on an image signal of a face area based on the first white balance correction value, whether the corrected image signal of the face area is present in a second color signal area different from a first color signal area indicating a flesh color;*

*calculating, using a processor, a second white balance correction value for correcting the image signal in a case where the corrected image signal of the face area is determined to be present in the second color signal area based on a relationship between the corrected image signal of the face area and the first color signal area; and*

*correcting white balance of the image using the first white balance correction value and the second white balance correction value.*

*19. A non-transitory computer-readable storage medium storing a control program for implementing a control method of controlling an image processing apparatus for processing an image signal of an image obtained by capturing, the control method comprising:*

*calculating, using a processor, a first white balance correction value by detecting a white pixel from the image;*

*detecting a face area from the image based on the image;*

*determining, in a case where white balance correction is executed on an image signal of the detected face area based on the first white balance correction value, whether the corrected image signal of the face area is present in a second color signal area around a first color signal area indicating a flesh color;*

*calculating, using a processor, a second white balance correction value for correcting the image signal in a case where the corrected image signal of the face area is determined to be present in the second color signal area based on a relationship between the corrected image signal of the face area and the first color signal area; and*

*correcting white balance of the image using the first white balance correction value and the second white balance correction value.*

*20. A non-transitory computer-readable storage medium storing a control program for implementing a control method of controlling an image processing apparatus for processing an image signal of an image obtained by capturing, the control method comprising:*

*detecting a face area from the image;*

*calculating, using a processor, a first white balance value used for white balance correction based on an image signal of a block present in a color signal area indicating white among blocks into which the image is divided for a plurality of pixels;*

*adding, in a case where the face area is detected, corrected image signals present in a first color signal area indicating a flesh color and a second color signal area that is a surrounding area of the first color signal area among corrected image signals obtained after correcting white balance of image signals of blocks included in the face area based on the first white balance correction value, and calculating, using a processor, a second white balance correction value in a case where a total of image signals obtained by the addition is present in the second color signal area for correcting the total of image signals to enter the first color signal area;*

*executing white balance correction for the image signal by using the first and second white balance correction values; and*

*executing, in a case where the second white balance correction value is calculated, white balance correction by using the second white balance correction value.*

*21. A non-transitory computer-readable storage medium storing a control program for implementing a control method of controlling an image processing apparatus for processing an image signal of an image obtained by capturing, the control method comprising:*

*calculating, using a processor, a first white balance correction value;*

*detecting a face area from the image;*

*determining, in a case where white balance correction is executed on an image signal of a face area based on the first white balance correction value, whether the corrected image signal of the face area is present in a second color signal area different from a first color signal area indicating a flesh color;*

*calculating, using a processor, a second white balance correction value for correcting the image signal in a case where the corrected image signal of the face area is determined to be present in the second color signal area based on a relationship between the corrected image signal of the face area and the first color signal area; and*

*correcting white balance of the image using the first white balance correction value and the second white balance correction value.*

* * * * *